United States Patent
Nguyen et al.

(10) Patent No.: US 7,507,078 B2
(45) Date of Patent: Mar. 24, 2009

(54) FLEXIBLE MOLDING DEVICE FOR MOLDING A SUNK GROOVE, A SUNK BLADE, AND A LARGE KEYHOLE SIPE IN TIRE TREAD

(75) Inventors: Gia-Van Nguyen, Blagny (FR); Anne-France Gabrielle Jeanne-Marie Cambron, Mersch (LU); Frank Pierre Severens, Arlon (BE); Raymond Marie Joseph Ghislain Houba, Vaux-sur-Sure (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 73 days.

(21) Appl. No.: 11/891,913

(22) Filed: Aug. 14, 2007

(65) Prior Publication Data

US 2008/0152745 A1    Jun. 26, 2008

Related U.S. Application Data

(60) Provisional application No. 60/876,324, filed on Dec. 21, 2006.

(51) Int. Cl.
*B29C 35/02* (2006.01)

(52) U.S. Cl. .................... 425/28.1; 425/37; 425/46; 425/438; 425/DIG. 58

(58) Field of Classification Search ............... 425/28.1, 425/35, 37, 46, 438, 470, 472, DIG. 58
See application file for complete search history.

(56) References Cited

U.S. PATENT DOCUMENTS

| | | | |
|---|---|---|---|
| 3,546,749 A | | 12/1970 | Wissel ............................ 18/44 |
| 5,075,067 A | * | 12/1991 | Rockarts et al. ............ 425/28.1 |
| 5,095,963 A | * | 3/1992 | Maitre ................... 152/209.18 |
| 5,843,326 A | * | 12/1998 | Bellot ........................ 249/104 |
| 6,143,223 A | | 11/2000 | Merino Lopez ............. 264/219 |
| 6,193,492 B1 | | 2/2001 | Lagnier et al. .............. 425/28.1 |
| 6,408,910 B1 | | 6/2002 | Lagnier et al. .......... 152/209.17 |
| 6,767,495 B2 | | 7/2004 | Aperce et al. ............... 264/326 |
| 7,338,269 B2 | * | 3/2008 | Delbet et al. ................... 425/37 |
| 2002/0134202 A1 | * | 9/2002 | Domange et al. .......... 76/101.1 |
| 2003/0201048 A1 | | 10/2003 | Radulescu et al. ..... 152/209.25 |
| 2006/0137793 A1 | | 6/2006 | Nguyen et al. ......... 152/209.18 |
| 2006/0137794 A1 | | 6/2006 | Nguyen et al. ......... 152/209.22 |

(Continued)

FOREIGN PATENT DOCUMENTS

DE        1274799        8/1968

(Continued)

OTHER PUBLICATIONS

European Search Report completed Mar. 11, 2008.

*Primary Examiner*—James Mackey
(74) *Attorney, Agent, or Firm*—June E. Rickey

(57) ABSTRACT

A tire mold and a molding device for forming a sunken groove, sipe in a tire is provided. The molding device molding device comprises a flexible member and a blade element, the flexible member having a distal end for mounting to a tire mold, a radiused midsection and a second end, wherein a portion of the second end is embedded within the blade element, the blade element having a lower surface with a cutout to allow bending of the flexible member.

25 Claims, 5 Drawing Sheets

U.S. PATENT DOCUMENTS

2006/0144491 A1    7/2006    Nguyen et al. ......... 152/209.18
2006/0144492 A1    7/2006    Nguyen et al. ......... 152/209.23

FOREIGN PATENT DOCUMENTS

| EP | 0 450 251 | B1 | 9/1996 |
| EP | 1050397 | A1 | 11/2000 |
| EP | 1586438 | A1 | 10/2005 |
| EP | 1676695 | A2 | 7/2006 |

* cited by examiner

FLEXIBLE MOLDING DEVICE FOR MOLDING A SUNK GROOVE, A SUNK BLADE, AND A LARGE KEYHOLE SIPE IN TIRE TREAD

This application claims the benefit of, and incorporates by reference, U.S. Provisional Application No. 60/876,324 filed Dec. 21, 2006.

FIELD OF THE INVENTION

The present invention relates to the molding of tires, and in particular, the molding of treads for a tire.

BACKGROUND OF THE INVENTION

As a tire wears, the volume of the tread decreases due to frictional contact with the road surface. More importantly, as the tire wears, the volume of the tire grooves decrease and the net to gross ratio increases. Eventually the tire will require replacement.

The tread elements in relief on a tire tread, such as the sipes, tread blocks and grooves, play a fundamental role in tire traction or adhesion to the road both in the transverse direction and in the circumferential direction. Traction is especially critical when travelling on wet or snowy roads. For wet conditions, the grooves act as evacuation channels trapping and evacuating water to allow tread blocks to be in contact with the ground.

It is known in the prior art to attempt to solve the degrading tread condition through the use of sunken grooves and sunken sipes. The sunken grooves, due to a limitation in manufacturing, are generally oriented perpendicular to the shoulder region. Molding elements are typically used to form the sunken grooves, and they are often difficult to remove from the tire once the tire has been cured. To make a sunken groove, the mold elements need to be rigid enough to penetrate the uncured or green rubber tread, but flexible enough to be extracted from the cured tire without damaging the tire. Another requirement is that the sunken groove needs to be large and thick enough to be efficient, which leads to a molding element so stiff that its extraction would damage the tire tread or the element itself would fail by a fatigue fracture.

Another problem with respect to the degrading tread pertains to the stiffness of the tread block. Blades are used to cut the tread block of a tire to allow the tread block softening and enhance grip. However, a blade normally has to start from the tread surface of a new tire. It is very difficult to have a sunk blade because extraction from the tire either damages the tread or the blade fails by fatigue fracture. But the blocks of a new tire are tall and sipes may be detrimental to tread stiffness and then to the handling of a new tire.

Thus it is desired to have a method and apparatus of forming sunk grooves, sunk sipes and large keyhole sipes that do not have the disadvantages described above.

SUMMARY OF THE INVENTION

The invention provides in a first aspect a molding device for forming a void a tread of a tire located below the tread surface, the molding device comprising a flexible member and a molding element, the flexible member having a distal end for mounting to a tire mold, and a second end, wherein the flexible member is joined to the molding element at a juncture, the molding element having a lower surface with a cutout to allow bending of the flexible member.

The invention provides in a second aspect a mold for molding a tread band of a tire, the tread band being made of an elastomer compound, the mold comprising a mold surface for molding the tread and a molding device projecting from the mold surface so as to become embedded in the elastomer compound to be molded, wherein the molding device comprises a flexible member and a molding element, the flexible member having a distal end for mounting to the tire mold, a radiused midsection and a second end, wherein a portion of the second end is embedded within the molding element, the molding element having a lower surface with a cutout to allow bending of the flexible member.

The invention provides in a third aspect a mold for molding a tread band of a tire, the tread band being made of an elastomer compound, the mold comprising a mold surface for molding the tread and a relief forming element projecting from the mold surface so as to become embedded in the elastomer compound to be molded, and a molding device comprises a flexible member and a molding element, the flexible member having a distal end for mounting to a tire mold, a radiused midsection and a second end, wherein a portion of the second end is joined to the molding element, wherein the flexible member is positioned about the relief forming element.

BRIEF DESCRIPTION OF THE DRAWINGS

The invention will be described by way of example and with reference to the accompanying drawings in which:

FIGS. 6A and 6B illustrates the sunken groove formed in the cured tire tread, wherein FIG. 6B illustrates the sunken groove in the direction 6B-6B of FIG. 6A;

DETAILED DESCRIPTION OF THE INVENTION

Figure 1:
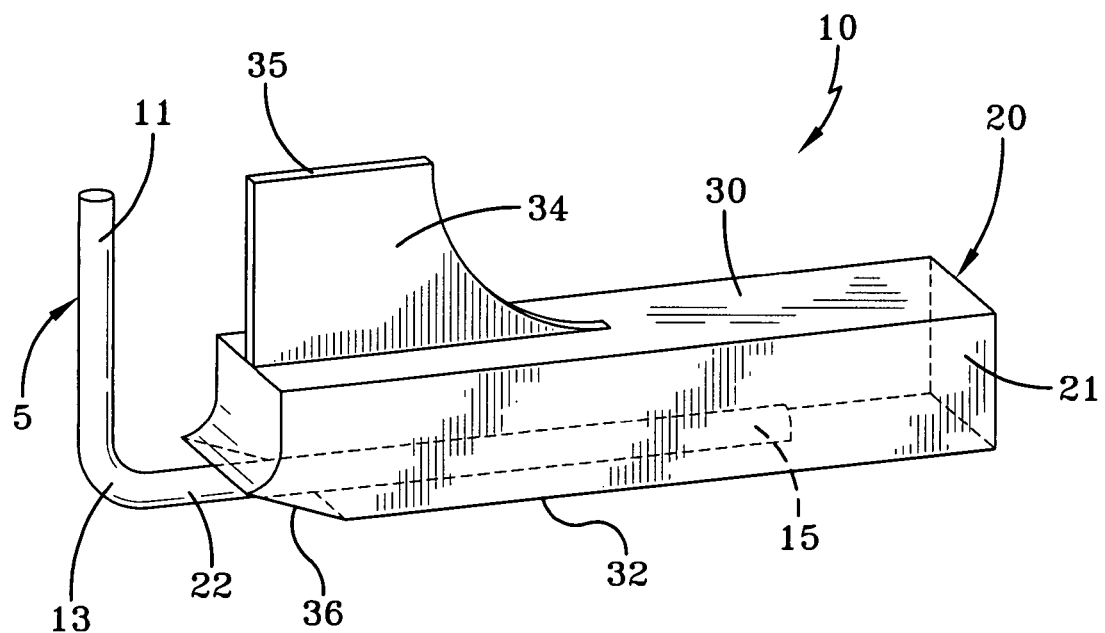
FIG. 1 is a perspective view of a molding element device for molding sunken grooves in a tire tread.

FIG. 1 illustrates a first embodiment of a groove molding device 10, suitable for molding sunken grooves in a tire tread. A sunken groove is an elongate void area disposed underneath the new tread surface of a tire that is not visible when the tire is new, and that as the tire tread is worn during service, the sunken groove is exposed. The molding element device 10 includes a flexible member 5 having a distal end 11, a radiused midsection 13 and a second end 15. The distal end 11 may be mounted in a tire mold in the tread forming portion at any desired orientation for forming sunken grooves. A portion of the second end 15 is embedded in molding element 20.

The molding element 20 has an upper surface 30 further comprising an optional sipe forming member 34 has an upper surface 35 which functions to mold a sipe in the upper portion of the tread. The sipe forming member 34 is thin and formed of a flexible material such as steel or aluminum. The sipe forming member 34 may have three-dimensional locking features such as bubbles, waffles or other protrusions or be wavy in any direction. The length of the sipe forming surface 35 may be sized as desired and is preferably positioned to be embedded in the upper portion of the tread of the green tire.

Figure 2:
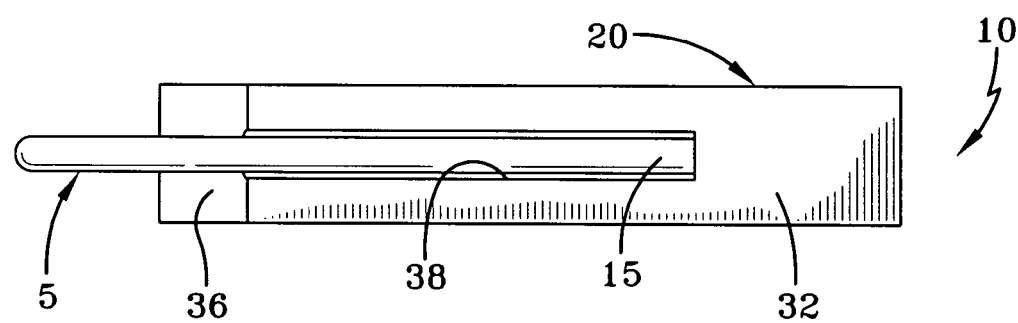
FIG. 2 is a bottom view of the device of FIG. 1.

As shown in FIG. 2, the general shape of the molding element 20 is preferably rectangular with a bottom surface 32 having an optional angled section 36 and with a cutout 38 to allow the bending of the flexible member 5 during extraction from the tire. The cutout 38 is a rectangular shaped groove having a width and length sized to allow the flexible member to bend unfettered. The molding element 20 is preferably only joined to flexible member at one location such as the very end 15 of the flexible member to allow unconstrained movement of the flexible member. To further facilitate unconstrained bending of the flexible member 5, there is a free portion 22 of the flexible member 5 located between the distal end 15 and the joined portion which is preferably close to the second end 15. The flexible member is not connected to the molding element 20 in the free portion 22. The free portion preferably has a length of at least about 10% to 80% of the length of the molding element 20, more preferably about 30-50%.

The length of the molding element 20 may range from about 10 to about 30 mm, preferably from about 15 to about 25 mm. The height of the molding element 20 may be in the range of about 2 to about 6 mm, preferably from about 4 to about 5 mm, and the width of the molding element may be in the range of about 3 to about 8 mm, and more preferably about 4-6 mm. The molding element 20 as shown is rectangular in shape, although other desired cross-sectional shapes may be used. The molding element 20 may be comprised of a rigid material such as steel or aluminum.

The flexible member 5 may be made of metal wire or any other flexible material. Preferably the flexible member 5 is comprised of a highly elastic, hyperelastic or superelastic material. It is preferred that the flexible member material have an elastic limit greater than or equal to about 5% elongation, and more preferably greater than or equal to 10%. Examples of hyperelastic materials suitable for the flexible member include shape memory alloys such as nickel-titanium alloys, copper zinc aluminum alloys, copper aluminum nitride alloys and copper aluminum beryllium alloys.

Figure 3A:
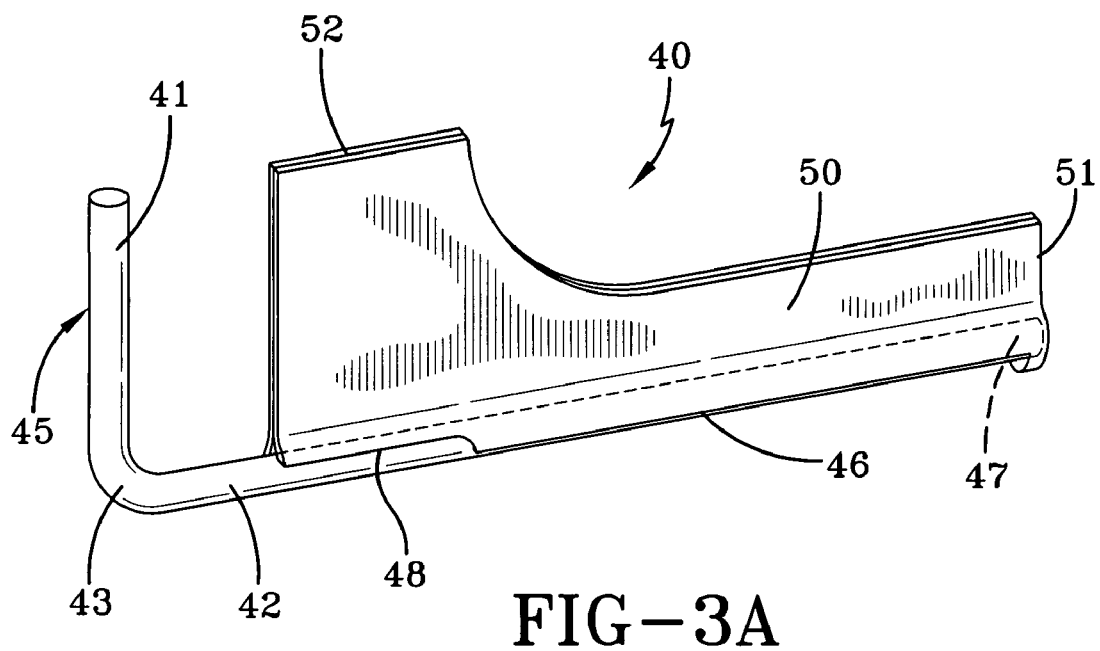
FIG. 3A is a perspective view of a molding element device for molding sunken sipes in a tire tread.

FIG. 3A illustrates a second embodiment of a sunk blade molding device 40 suitable for molding sipes in the upper surface of the tread and below the surface of the tread (i.e., sunken sipe). The blade molding device 40 includes a flexible member 45 having a distal end 41, a radiused midsection 43 and a second end 47. The distal end 41 may be mounted in a tire mold in the tread forming portion at any desired orientation for forming sunken grooves. A portion of the second end of the flexible member 45 is embedded in a blade element 50. Preferably, the flexible member is joined to the blade element at or near the very end 47.

Figure 5:
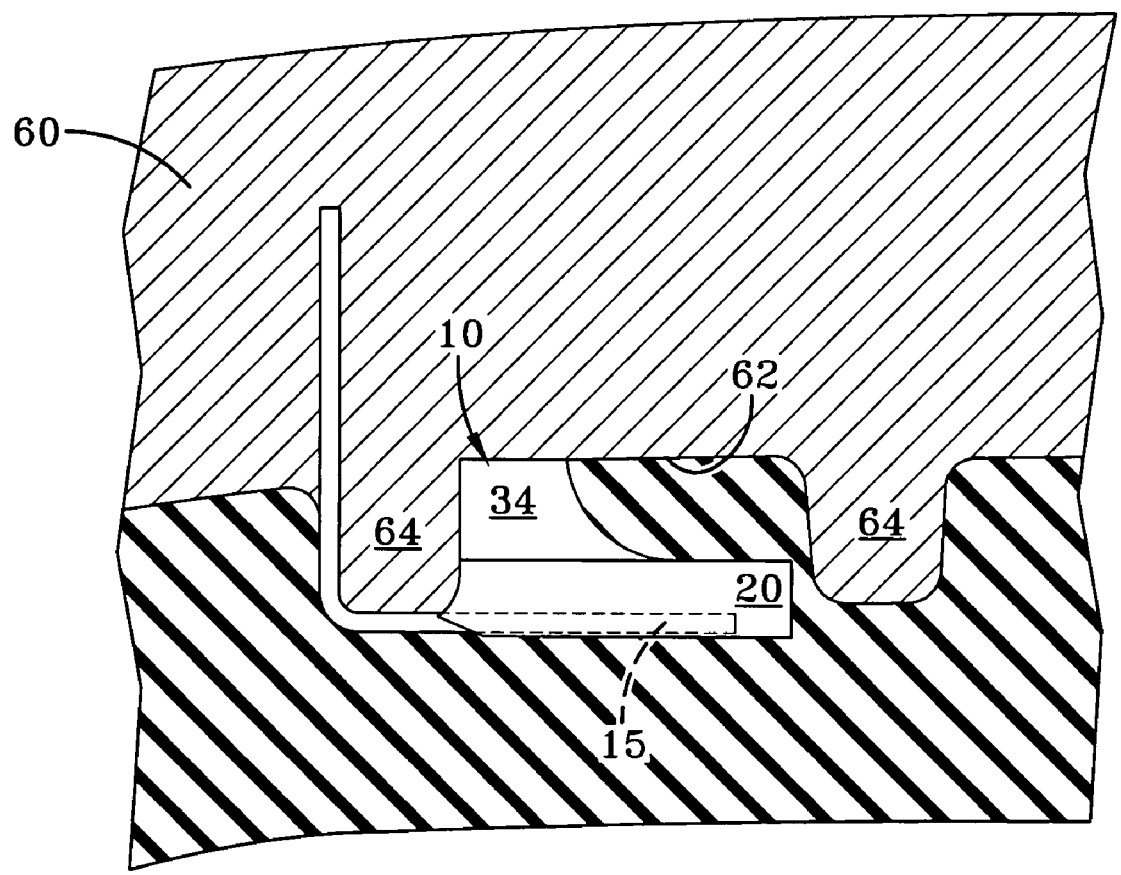
FIG. 5 is a schematic of the molding groove device of FIG. 1 shown installed in a mold and embedded in a green tire.

The blade element 50 is thin and formed of a rigid material such as steel or aluminum. The blade element 50 has an optional upper surface 52 which functions to mold a sipe in the upper portion of the tread. The length of the sipe forming surface 52 may be sized as desired and preferably has a sharp edge. Preferably the sipe forming surface is located in abutment with the mold inner surface 62 as shown in FIG. 5.

Figure 3B:
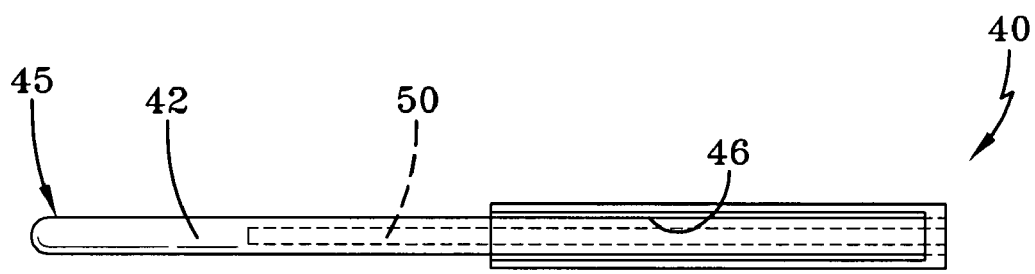
FIGS. 3B is a bottom view of the device of FIG. 3A.

As shown in FIG. 3B, the general shape of the blade element 50 is L shaped with a bottom surface 46 having a cutout portion 48 to facilitate the unconstrained bending of the flexible member 45 during extraction from the tire. To further facilitate unconstrained bending of the flexible member 5, there is a free portion 42 of the flexible member 45 located between the distal end 41 and up to where the flexible member is joined to the blade 50, which is preferably close to the second end 47. The free portion 42 preferably has a length of at least about 10%-80% of the length of the blade element 50, and more preferably about 30-50%.

Figure 3C:
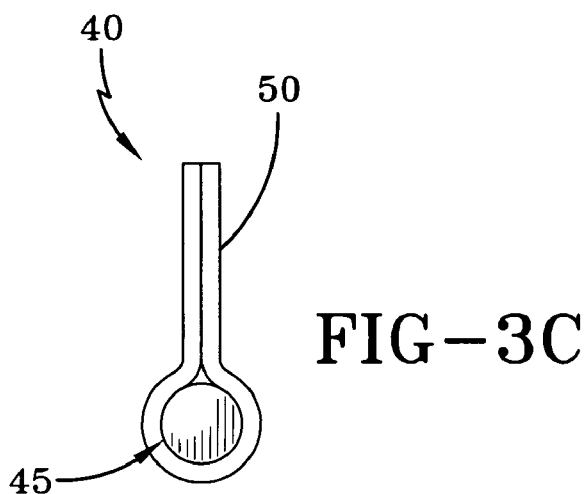
FIG. 3C is another exemplary cross-sectional shape of the molding element device shown in FIG. 3A.

The blade element 50 is not limited to the cross-sectional shape as shown. The blade element may be shaped to form a large keyhole sipe as shown in FIG. 3C with a thickness in the range of about 3 to about 8 mm, preferably about 4-6 mm.

The length of the blade element 50 may range from about 10 to about 30 mm. The height of the blade element may be close to the height of the new tire nonskid, and the thickness of the blade element 50 may be in the range of about 1 to about 2 mm. The thickness may vary from the top to the bottom part of the blade element.

The flexible member 45 may be made of metal wire or any other flexible material. Preferably the flexible member 45 is comprised of a highly elastic, hyperelastic or superelastic material. It is preferred that the flexible member 45 be made from a material having an elastic limit greater than or equal to about 5% elongation, and more preferably greater than or equal to 10%. Examples of hyperelastic materials suitable for the flexible member include shape memory alloys such as nickel—titanium alloys, copper zinc aluminum alloys, copper aluminum nitride alloys and copper aluminum beryllium alloys.

The blade element 50 is connected to the flexible member 45 via conventional techniques, such as by welding. The cutout portion 48 is not connected to the free portion 42 of the flexible member to allow unconstrained bending which is important for extraction from the tire.

Figure 4A:
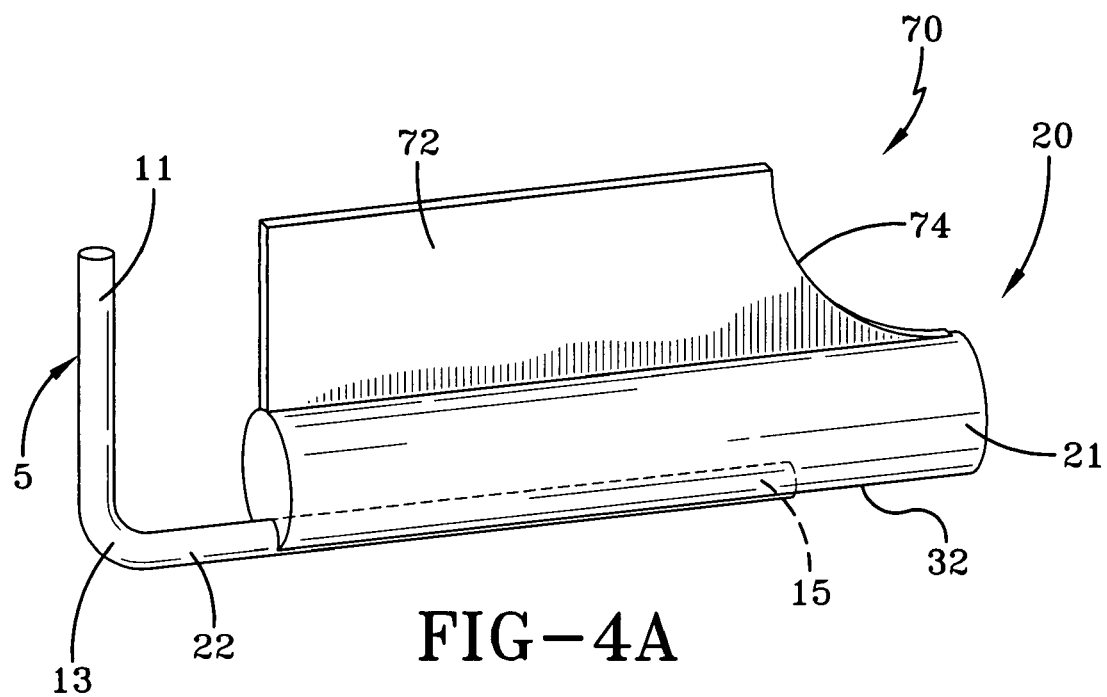
FIGS. 4A and 4B are perspective views of a molding element device for molding sunken keyhole sipes in a tire tread.
Figure 4B:
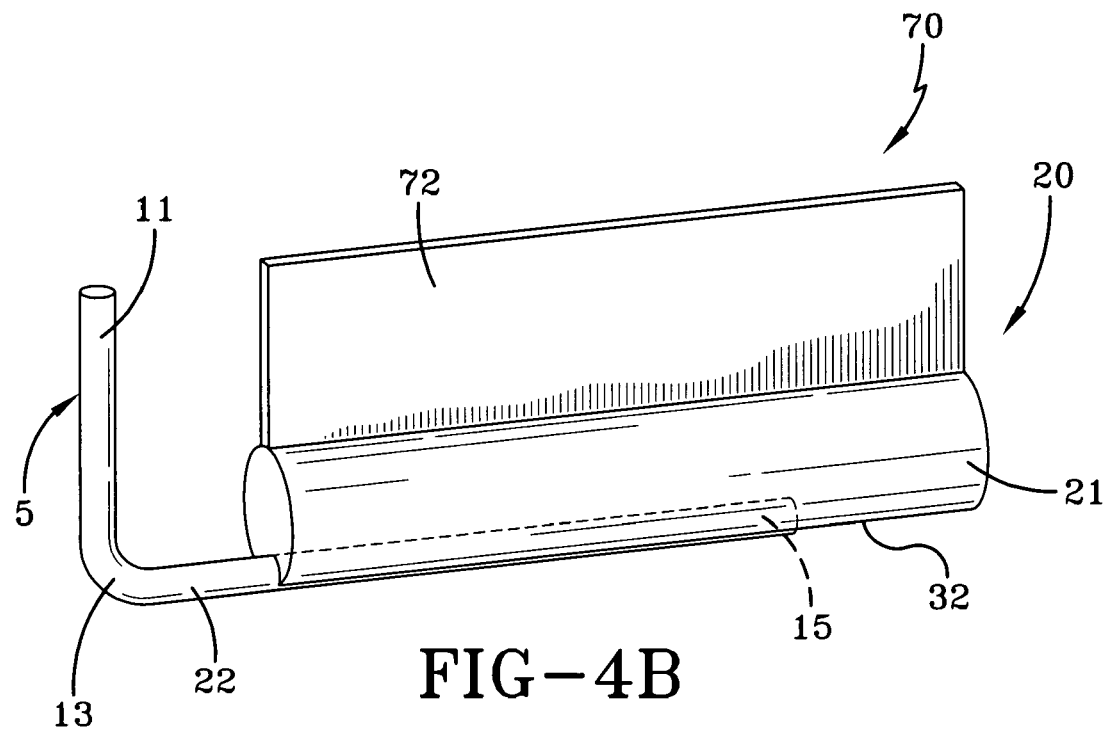

FIGS. 4A and 4B illustrate a third embodiment of a molding device 70. The molding device is useful for molding sunk key hole sipes in a tire tread. The molding device 70 is similar to molding device 10 except for the following differences. The molding element 20 as shown has a round cross-sectional shape, although a square or other shape may be utilized. The molding device has an upper blade portion 72 for molding a sipe in the tread. As shown in FIG. 4B, the upper blade portion preferably extends across the entire upper surface of the molding element 20. The blade portion 72 may have an optional tapered end 74 as shown in FIG. 4A.

FIG. 5 illustrates the groove molding device 10 shown installed in a tire mold 60. Although not shown, the other molding devices 40, 70 may be similarly installed in the tire mold 60. The molding device 10, 40, 70 is embedded in the green tire tread prior to cure. The molding device 10, 50 may be mounted to in any desired orientation to the tire mold, so that for example, the sunken groove may be oriented circumferentially, axially or any other desired configuration. The molding device may be mounted in the segments of the mold corresponding to the crown portion of the tread or located in the portions of the mold corresponding to the sidewalls. The tire mold 60 has an inner surface 62 having relief elements 64 for forming a respective groove 66 in a tire tread. Preferably, the molding device is installed in the mold such that the relief forming element 64 is positioned in the U shaped space located between the flexible member and the molding element 20, 50 so that a portion of the flexible member abuts the relief forming element 64. More preferably, the molding device is mounted such that the end 21, 51 of the molding element 20, 50 engages a second relief forming element 64.

Figure 6A:
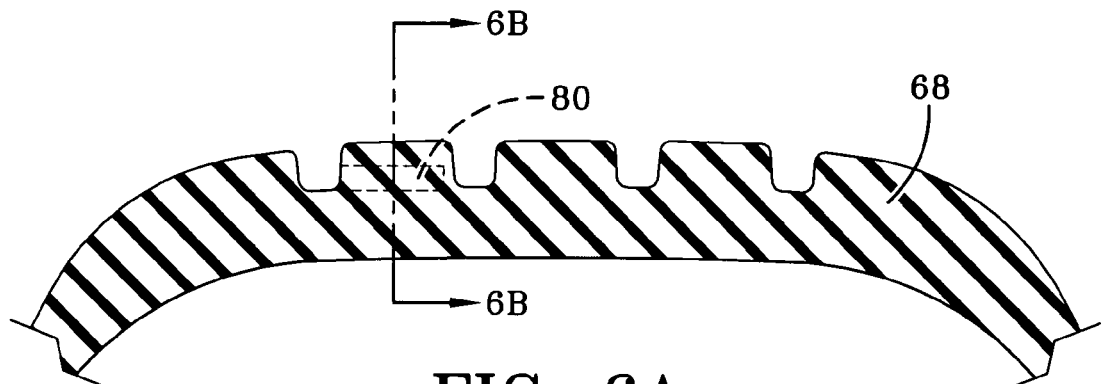
Figure 6B:
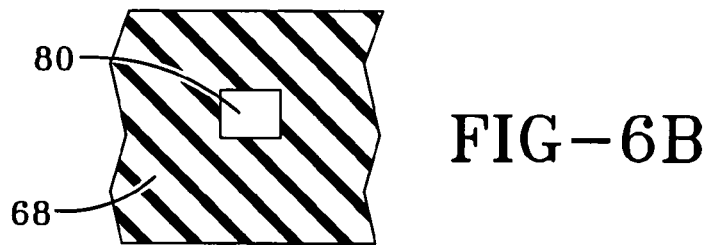
Figure 7A:
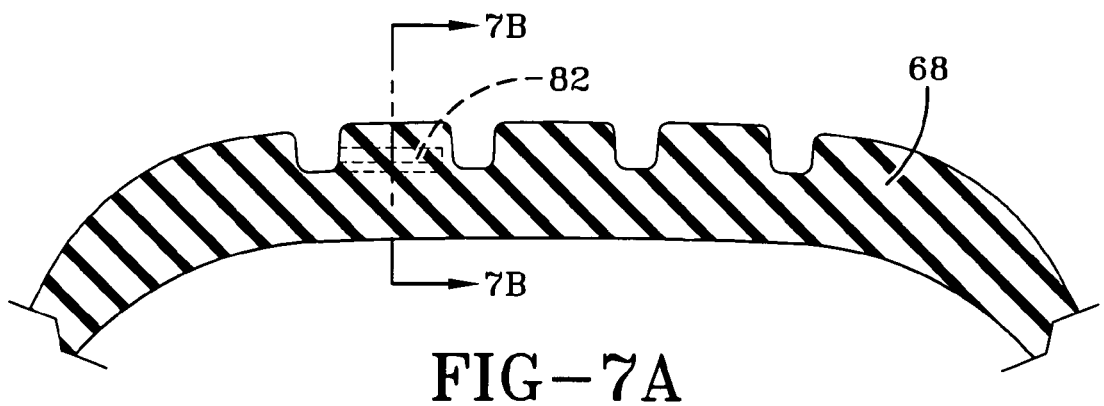
FIG. 7A illustrates a sunken sipe in a cross-section of the cured tire tread.
Figure 7B:
FIG. 7B illustrates a sunken keyhole sipe in a cross-section of the cured tread in the direction 7B-7B of FIG. 7A.

The relief forming element 64 typically forms a groove 66 in the tread of the tire. After the tire tread has been cured, the molding device is extracted from the formed groove 66 in the tread 68. As the molding device is pulled from the tread (not shown), the flexible member 5, 45 elastically deforms so that the blade element 30, 50 can be extracted from the tread without damaging the tread. FIGS. 6A and 6B illustrate the sunken void/groove 80 formed below the tread surface of the cured tire, and FIG. 5c illustrates the sunken sipe 82. At a given cross-section of the tire tread, the void 80, 82 formed is completely encapsulated by the tire tread 68.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A molding device for forming a void in a tread of a tire located below the tread surface, the molding device comprising a flexible member and a molding element, the flexible member having a distal end for mounting to a tire mold, and a second end, wherein the flexible member is joined to the molding element at a juncture, the molding element having a lower surface with a cutout to allow bending of the flexible member.

2. The molding device of claim 1 wherein the flexible member has a free portion not connected to the molding element between the distal end and the juncture.

3. The molding device of claim 1 wherein the juncture is located about the second end of the flexible member.

4. The molding device of claim 1 wherein the juncture is located within about 1 to 3 mm from the second end.

5. The molding device of claim 1 wherein the molding element has an upper surface with a blade mounted thereon for molding a sipe in an upper portion of the tread.

6. The molding device of claim 5 wherein the blade extends across the entire upper surface of the molding element for forming a keyhole sipe.

7. The molding device of claim 2 wherein the free portion has a length of at least about 5 mm.

8. The molding device of claim 1 wherein the flexible member is formed from a wire.

9. The molding device of claim 1 wherein the flexible member is formed from a material having an elastic limit greater than or equal to 5% elongation.

10. The molding device of claim 1 wherein the flexible member is formed from a material having an elastic limit greater than or equal to 10% elongation.

11. The molding device of claim 1 wherein the flexible member is formed from a shape memory alloy.

12. The molding device of claim 1 wherein the molding element is a blade having a thickness in the range of about 3 to about 8 mm.

13. The molding device of claim 1 wherein the molding element has a length of about 10 mm to about 30 mm.

14. A mold for molding a tread band of a tire, the tread band being made of an elastomer compound, the mold comprising a mold surface for molding the tread and a molding device projecting from the mold surface so as to become embedded in the elastomer compound to be molded, wherein the molding device comprises a flexible member and a molding element, the flexible member having a distal end for mounting to the tire mold, a radiused midsection and a second end, wherein a portion of the second end is embedded within the molding element, the molding element having a lower surface with a cutout to allow bending of the flexible member.

15. The mold of claim 14 wherein the flexible member has a free portion located between the radiused midsection and the second end.

16. The mold of claim 14 wherein the molding element has an upper blade surface for molding a sipe in the upper portion of the tread.

17. The mold of claim 15 wherein the free portion has a length of at least about 5 mm.

18. The mold of claim 14 wherein the flexible member is formed from a wire.

19. The mold of claim 14 wherein the flexible member is formed from a material having an elastic limit greater than or equal to 5% elongation.

20. The mold of claim 14 wherein the flexible member is formed from a material having an elastic limit greater than or equal to 10% elongation.

21. The mold of claim 14 wherein the flexible member is formed from a superelastic alloy.

22. A mold for molding a tread band of a tire, the tread band being made of an elastomer compound, the mold comprising a mold surface for molding the tread and a relief forming element projecting from the mold surface so as to become embedded in the elastomer compound to be molded, and a molding device comprises a flexible member and a molding element, the flexible member having a distal end for mounting to the mold, a radiused midsection and a second end, wherein a portion of the second end is joined to the molding element, wherein the flexible member is positioned about the relief forming element.

23. The mold of claim 22 wherein the molding element has a lower surface with a cutout to allow bending of the flexible member.

24. The mold of claim 22 wherein the molding element has a rectangular cross-sectional shape.

25. The mold of claim 22 wherein the molding element has an upper blade on an upper surface of the molding element, wherein the upper blade is in abutment with the mold surface.

* * * * *